US012790261B2

(12) United States Patent
Mangold et al.

(10) Patent No.: US 12,790,261 B2
(45) Date of Patent: Nov. 10, 2026

(54) GLASS OR GLASS-CERAMIC PLATE AND METHOD OF MAKING AND USE

(71) Applicant: SCHOTT AG, Mainz (DE)

(72) Inventors: Stephanie Mangold, Mainz (DE); Jochen Drewke, Mainz (DE)

(73) Assignee: SCHOTT AG, Mainz (DE)

( * ) Notice: Subject to any disclaimer, the term of this patent is extended or adjusted under 35 U.S.C. 154(b) by 381 days.

(21) Appl. No.: 18/365,532

(22) Filed: Aug. 4, 2023

(65) Prior Publication Data

US 2024/0043319 A1 Feb. 8, 2024

(30) Foreign Application Priority Data

Aug. 4, 2022 (DE) ..................... 10 2022 119 588.0

(51) Int. Cl.

*C03C 17/00* (2006.01)
*C03C 10/00* (2006.01)
*C03C 17/02* (2006.01)

(52) U.S. Cl.

CPC ........ *C03C 10/0027* (2013.01); *C03C 17/002* (2013.01); *C03C 17/007* (2013.01);
(Continued)

(58) Field of Classification Search

CPC . C03C 10/0027; C03C 10/009; C03C 17/002; C03C 17/02; C03C 17/04;
(Continued)

(56) References Cited

U.S. PATENT DOCUMENTS 7,763,832 B2 7/2010 Striegler
2013/0309448 A1† 11/2013 Striegler
(Continued)

FOREIGN PATENT DOCUMENTS

CN 101691310 4/2010
CN 112123948 A † 12/2020
(Continued)

OTHER PUBLICATIONS

WO2021121846A1 , English Translation Description, Gudeon et. al. "Method for Manufacturing a Glass Ceramic Article", Espacenet Sep. 19, 2025, Jun. 24, 2021, Year 2021 (Year: 2021).*
(Continued)

*Primary Examiner* — Alison L Hindenlang
*Assistant Examiner* — Christopher Paul Daigler
(74) *Attorney, Agent, or Firm* — Ruggiero McAllister & McMahon LLC

(57) ABSTRACT

A glass or glass-ceramic plate is provided that has two side faces, a thickness of between 2 mm and 6 mm, a circumferential edge face, a flatness less than or equal to 0.1%, and a region of a first face having a mean surface roughness of less than 0.5 μm and a standard deviation of the surface roughness of less than 0.1 μm. The mean surface roughness and the standard deviation are determined by measuring a roughness at nine points on the first face by measuring a line profile with a stylus device and with evaluation according to ISO 4827. The nine points are at least 5 cm apart from one another. The plate further includes a coating on two subregions of the region that are at least 3 cm apart from one another, where the coating has a raggedness in the subregions that differ by not more than 10%.

11 Claims, 4 Drawing Sheets

(52) U.S. Cl.
CPC .......... *C03C 17/02* (2013.01); *C03C 2203/52* (2013.01); *C03C 2217/77* (2013.01); *C03C 2218/119* (2013.01); *C03C 2218/31* (2013.01); *C03C 2218/32* (2013.01)

(58) Field of Classification Search
CPC ........... C03C 17/007; C03C 8/16; C03C 8/04; C03C 2204/08; C03C 2218/119; C03C 2217/485; B41J 2/14
See application file for complete search history.

(56) References Cited

U.S. PATENT DOCUMENTS

| | | | | |
|---|---|---|---|---|
| 2018/0242733 | A1 | 8/2018 | Debreyer | |
| 2019/0059131 | A1 | 2/2019 | Debreyer | |
| 2019/0128534 | A1* | 5/2019 | Roux | F24C 7/067 |
| 2020/0354264 | A1 | 11/2020 | Menke-Berg | |
| 2020/0361813 | A1* | 11/2020 | Roux | C03C 17/04 |
| 2021/0115281 | A1* | 4/2021 | Guedon | C03C 3/062 |
| 2021/0188701 | A1 | 6/2021 | Roux | |
| 2021/0214270 | A1* | 7/2021 | Shimizu | C03C 3/087 |

FOREIGN PATENT DOCUMENTS

| | | | |
|---|---|---|---|
| DE | 102010045149 | | 3/2012 |
| DE | 202016008268 | | 6/2017 |
| DE | 102018122020 | | 2/2020 |
| EP | 3220059 | | 9/2017 |
| EP | 3346876 | | 7/2018 |
| JP | 2015176753 | | 10/2015 |
| JP | 2015176753 | A * | 10/2015 |
| WO | 2016075972 | | 5/2016 |
| WO | 2017042474 | | 3/2017 |

OTHER PUBLICATIONS

Preview oif ISO/IEC TS 24790 First Edition Aug. 15, 2012, Corrected version Dec. 15, 2012, Google Feb. 25, 2026, Year 2012 (Year: 2012).*

JP2015176753A—English Translation Description, "Top Plate for Cooking Device", Minowa et. al. Espacenet Jun. 10, 2026, Oct. 15, 2015, Year 2015 (Year: 2015).*

Third Party Pre-issuance Submission filed on May 30, 2025; 124 pages.

* cited by examiner
† cited by third party

GLASS OR GLASS-CERAMIC PLATE AND METHOD OF MAKING AND USE

CROSS REFERENCE TO RELATED APPLICATIONS

This application claims benefit under 35 USC § 119 of German Application 10 2022 119 588.0 filed Aug. 4, 2022, the entire contents of which are incorporated herein by reference.

BACKGROUND

1. Field of the Invention

The invention relates generally to plates comprising glass or glass-ceramic, more particularly those which at least partially bear a coating, to a process for producing such plates, and to their use. The invention relates specifically to a plate comprising a glass or a glass-ceramic, more particularly a lithium aluminium silicate glass or a lithium aluminium silicate glass-ceramic, which comprises a coating.

2. Description of Related Art

Coated glass or glass-ceramic plates have already been known for a long time and for many years have been employed, for example, as covering plates of cooking appliances (for example also called "hobs" or "cooking surfaces"). In general such plates bear at least one coating. Known, for example, are plates comprising a volume-coloured substrate which on the user-facing side (also referred to as "top side" or "facing side") bears applied cooking zone markings. The printing of logos is also known. Moreover, there are also known plates which comprise a substrate which is not volume-coloured and bears an applied "underside coating". Depending on the exact configuration of such a plate, different coatings on different sides of such a plate may be combined with one another.

Printing processes are generally used as the application process of choice. State of the art here in particular is the screen printing process, which permits a high throughput in the manufacture of printed plates. Disadvantages of this, however, are that these plates have to be printed always the same and that different process steps are required for different printing inks.

As an alternative, therefore, inkjet printing has become increasingly significant. With these processes, the production of such plates is in principle more flexible. For example, smaller unit numbers in a series can now be produced.

In actual practice, however, it has emerged, for reasons not yet resolved, that the print quality in screen printing is generally better than in inkjet printing.

European Patent Application EP 3 346 876 A1 describes large-area worktops for a kitchen block, having a minimum area of 0.7 $m^2$ and a flatness of less than 0.1% of the substrate diagonal. Here, however, the quality of the printing is not addressed. Nor is there any mention of inkjet printing. Also, there is no addressing of the surface roughness of this worktop, which is relevant to the quality of an inkjet print.

U.S. Patent Application US 2019/128534 A2 describes a glass-ceramic plate for kitchen furnishing having a low flatness of less than 0.1% relative to the diagonal. Here again, however, there is no mention of print quality or inkjet printing. Nor is the surface roughness of this worktop addressed, which is relevant to the quality of an inkjet print.

Japanese Patent Application JP 2015/176753 A describes polished surfaces of plates which are used as hobs. Here, however, there is no addressing of the quality of an applied decoration, the focus instead being more on the reflectivity of the surfaces, or their gloss, and on the visual impression conveyed by underside printing.

No document of the prior art addresses improvement in the printed image specifically in the case of contactless printing, such as by means of inkjet printing, for example.

There is a need, accordingly, for glass and glass-ceramic plates which have a good printed image in a contactless printing process, such as inkjet printing, for example, and for a process for producing them.

SUMMARY

The object of the invention lies in the provision of plates comprising a substrate of glass or glass-ceramic and at least one coating, which at least partly alleviate the problems of the prior art. There is also a need, correspondingly, for a process for producing such plates.

The disclosure therefore relates to a plate comprising glass or glass-ceramic having two mutually opposite side faces and a circumferential edge face, where the flatness of the plate is less than or equal to 0.1% of a lateral dimension and at least one side in at least one region has a mean surface roughness $R_{z,mean}$ of less than 0.5 μm with a standard deviation of the surface roughness, $\sigma_{Rz}$, of less than 0.1 μm, further comprising a coating which is disposed on at least two different subregions of the at least one region of the at least one side of the plate, where the at least two subregions are at least 3 cm apart from one another and where the raggedness of the coating in the two subregions differs by not more than 10%.

A configuration of this kind has a series of advantages.

The simultaneously good flatness and roughness of the plate, indeed, allow excellent print quality for the coating, including—for example—in an inkjet printing process. The very good print quality is manifested in particular in the "raggedness" of the coating in question. Raggedness according to one embodiment may preferably be determined according to ISO 24790.

Raggedness is a measure of the image quality of a printed image and describes, for example, what is called the edge definition. The process for determining raggedness is elucidated in detail later on below, in FIGS. 1*a*-1*c*.

The flatness of the plate is less than or equal to 0.1% of a lateral dimension, preferably of the largest lateral dimension, of the plate. According to one embodiment, for example, the corresponding lateral dimension of the plate may be the diagonal of a rectangular plate. The diagonal here is understood generally to mean the surface diagonal of the plate, i.e., the diagonal of one of the principal faces (or sides) of the plate.

Generally, in the context of the present disclosure, a lateral dimension refers to one of the lengthwise dimensions of the plate. A plate in the context of the present application is understood generally to be a body whose dimensions in two spatial directions of a cartesian coordinate system are at least one order of magnitude greater than in the third spatial direction, which is perpendicular to these two first spatial directions. In other words, the thickness of a plate is at least one order of magnitude lower than its length and width. Length and width of the plate determine the principal faces (in contrast to the circumferential edge faces, which account for only a small proportion of the overall surface area of the plate) for a generally rectangular plate. A lateral dimension in the sense of the present invention, however, is more particularly the surface diagonal, which in the context of the present application is also referred to as the diagonal. This is the largest lateral dimension of a generally rectangular plate. For the case of a non-rectangular plate, for example, the diameter may take the place of length, width or diagonal and be designated as the corresponding lateral dimension.

Advantageously, the mean surface roughness $R_{z,mean}$ and the standard deviation of the surface roughness, $\sigma_{Rz}$, are determined by measuring the roughness $R_z$ at nine points on the plate, which are each at least 5 cm, preferably at least 10 cm and more preferably at least 15 cm apart from one another, and from these nine measurement values determining the arithmetic mean and the standard deviation. More preferably $R_z$ is determined by measuring a line profile with a stylus device and with evaluation according to ISO 4287.

This flatness is advantageous because in this way it is both possible to apply the coating homogeneously in the printing and hence it is possible to print even small and fine structures with high quality. Furthermore, however, it is also advantageous since in this way a plate may be easier to install. It has also emerged that such an arrangement may improve the visibility of displays. Indeed, as a result of a uniform surface with only minimal fluctuations in plate thickness, lightness differences in the representation are very largely minimized. This is advantageous particularly in the context of volume-coloured material. Here, fluctuations in thickness have exponential effects via the transmission properties.

Advantageously, this may also be combined with a plate which is not only very smooth, in other words not very rough, and planar in configuration on at least one side, but where instead the two side faces are disposed parallel to one another. According to one embodiment, therefore, preference may likewise be given to a disposition of the side faces parallel to one another. An arrangement is understood to be parallel when the normal angles to the side faces form an angle with one another of not more than 5°, preferably of not more than 2°, and very preferably, within the bounds of customary manufacturing and measurement tolerances, of 0°.

If one side of the plate has a nubbed embodiment, the normal angle is determined on the basis of the surface produced by the tips of the nubs.

Furthermore, the inventors also assume that in this way there is also a general improvement in the processing of the plate. As a result of the improved flatness and roughness, the dimensional integrity of the plates generally is improved as well. Accordingly, however, they are also easier to handle and can be bonded more effectively, for example.

According to one embodiment, the plate may have a thickness of between 2 mm and 6 mm. This is advantageous precisely for use of the plate as a covering plate in a cooking appliance, since in this way there can be a good compromise between minimum thickness, which is advantageous for the cooking onset characteristics, and sufficient strength of the plate, which is vital for such application and which increases in line with the plate thickness.

In general, the flatness and roughness of the plate according to the disclosure are advantageous for all types of and methods of coating. This is particularly advantageous, however, for inkjet print coatings.

The reason is that the flatness determines the minimum distance from the printhead in the case of the contactless inkjet printing process. It has been found that precisely for contactless printing processes, the distance between the printhead and the print substrate is very important for a good printed image. In the case of a flatness of more than 0.1%, there may be a height difference here of up to 600 μm (in the case of a diagonal of 60 cm, for example). It would be possible, accordingly, for the distance between the printhead and the substrate not to be sufficient for the drop actually to detach after emergence from the printhead and to develop fully. Precisely in the case of small distances between printhead and substrate, such as only 1 mm, for example, this can be very critical. In theory it would be possible to correct this by means of an in-line determination of the distance from plate to printhead, by adjusting the height of the printhead on the basis of the distance measured. To do so, however, would imply a high degree of expenditure on machinery. Through the targeted use of flat and planar substrates, however, this can be skillfully circumvented.

The low flatness allows the defined deposition of drops. This leads to more effective print control and to a reproducible deposition of drops. Accordingly, improved resolution of printed images is possible as well.

Precisely in the case of inkjet printing it has emerged as being important for the distance between the substrate and the printhead to be precisely observed. The reason is that only this ensures that the drop shape of the liquid or other printing ink used is optimally developed. Hence it is important to observe a minimum distance between printhead and substrate, which may be about 1.5 mm. Depending on the printing machine, however, small distances are possible as well, of 1 mm, for example. If the distance is below the minimum, the drop shape is unable to develop in the optimal, at least approximately spherical, manner.

If, conversely, the distance between printhead and substrate is too large, the drop may be deflected, and so does not land at the actually intended site on the substrate, and/or so-called satellites are formed. This leads to reduced edge definition, and possibly to holes in the printed image as well.

Each of these factors leads to an unsettled and poorly defined printed image. It is particularly difficult if different printed images are applied between regions of a substrate and in this case, owing to a lack of flatness and roughness, the printed images are printed with different definition at different sites on the plate.

According to one embodiment, the coating comprises a glass flux and/or is embodied as enamel. The coating is preferably embodied as a coating comprising a glass flux and/or as an enamel, and comprising at least one pigment. More preferably the at least one pigment comprises no pigment particles having a primary grain size, determined as $d_{50}$ of the equivalent diameter, of more than 1.0 μm, very preferably no pigment particles having a primary grain size, determined as $d_{90}$ of the equivalent diameter, of more than 2.5 μm.

A configuration of this kind is particularly advantageous, because coatings comprising glass flux or coatings embodied as enamel have particular thermal stability and, moreover, also adhere well to vitreous surfaces, such as the surfaces of glass or of glass-ceramic. Such coatings may be configured, for example, so that a so-called "incipient-melting reaction zone" is developed, so that the coating, or the glass flux comprised by the coating, and the substrate material enter into an intimate bond during firing. In this way, such coatings are also configured such that they may be used, for example, as a top-side decoration on cooking surfaces. Such top-side decorations, which are used, for example, for the printing of logos or the marking of cooking zones, are required to withstand the in some cases very harsh cleaning conditions (using a glass scraper) and also the service conditions (abrasion due for example to the displacement of cookware, in some cases under heat load).

In the context of the present disclosure, coatings which comprise a glass flux are understood to be those coatings which have at least one vitreous constituent, produced for example from a paste comprising a glass powder. In the context of the present disclosure, such coatings are also referred to as “enamel”, especially when the glass flux at least partly melts during firing.

In principle it is possible for the coating disposed on the substrate to comprise only a glass flux. In this case it may also be understood or referred to as a “glaze”. Generally, however, it is possible, and may indeed be preferable, for the coating as well as a glass flux to comprise at least one pigment and/or to be embodied as an enamel comprising at least one pigment. In this way, firstly, the visibility of any marking is increased, and this may increase, for example, the user safety provided by a cooking appliance equipped with such a plate. Secondly, depending on the nature of the pigment, the mechanical resistance of the coating may also be increased, if, for example, a particularly abrasion-resistant pigment is used.

Suitable glass fluxes may have a composition, for example, based on $SiO_2$ and $B_2O_3$ or based on $Bi_2O_3$ and $SiO_2$. Here, “based on” means that these components account for at least wt % of the composition.

Examples of glass fluxes based on $SiO_2$ and $B_2O_3$ are given later on below.

Two examples of suitable glass fluxes based on $Bi_2O_3$ and $SiO_2$ are set out in the following table.

| Component | wt % | wt % |
|---|---|---|
| $SiO_2$ | 19.9 | 16.1 |
| $B_2O_3$ | 12.2 | 9.6 |
| $Al_2O_3$ | 0.6 | 0.5 |
| $Na_2O$ | 5.3 | 4.3 |
| $K_2O$ | 0.14 | 0.17 |
| ZnO | 3.9 | 10.2 |
| $TiO_2$ | 2.6 | 5.9 |
| $ZrO_2$ | 3.3 | 2.6 |
| $SnO_2$ | 0.12 | 5.6 |
| $Bi_2O_3$ | 50 | 42 |
| $HfO_2$ | 0.07 | 0.05 |
| Density [g/cm$^3$] | 4.49 | 4.75 |
| $\alpha_{20-300}$ [ppm/K] | 8.15 | 8.11 |
| $T_g$ [° C.] | 487 | 495 |
| $E_w$ [° C.] | 599 | 581 |
| $V_a$ [° C.] | 830 | 889 |

By a pigment is meant, presently, a colorant which comprises particles of solid. In particular, the pigment according to the present disclosure may be configured as a ceramic colorant. By “ceramic” is meant, in the context of the present invention, inorganic, nonmetallic substances. This is advantageous because ceramic colorants possess a high temperature stability which is necessary precisely for the applications addressed here.

It may also be advantageous, furthermore, if the primary grain size of the pigment particles, i.e., of the particles encompassed by the colorant, is limited correspondingly, as set out above. This is advantageous for coating by means of inkjet printing, without any clogging of the nozzles occurring. Furthermore, the use of fine pigment particles also simplifies the printing of fine structures and may therefore be employed here with particular advantage, since because of the great planarity and flatness of the plate according to the present disclosure, such fine structures can now be represented to particularly good effect.

In particular, it is also possible for the plate to be embodied as a plate which is smooth on both sides, this meaning in particular that no side of the plate has a nubbed embodiment. Plates smooth on both sides may be particularly advantageous when high-resolution displays are to be disposed beneath the plate. It is precisely the low roughness and the low plate roughness that are especially suitable for such a configuration, and may therefore also be combined well with a high-resolution display.

Alternatively, especially in cases where particularly high strength of the plate is necessary or advantageous, provision may also be made for one side of the plate to be smooth and for the side opposite that side to have a nubbed embodiment, in which case the coating is disposed on the smooth side of the plate. In this case, the nubbed side of the plate is embodied as the underside. As a result of the nubbed structure, any mechanical damage to the vitreous or glass-ceramic material may be at least somewhat attenuated in terms of its effect on the strength of the plate. As a result, the handling of the plate is made easier as well.

According to one embodiment, the plate comprises a glass-ceramic, with the glass-ceramic preferably comprising at least one of the following features: the glass-ceramic has a volume-coloured embodiment, the glass-ceramic comprises on the at least one side no vitreously embodied surface zone.

A configuration of the plate in the form where it comprises glass-ceramic is particularly advantageous, because glass-ceramic, more particularly what is called a lithium aluminium silicate glass-ceramic, has a high strength and a low thermal expansion and hence also has a sufficient temperature-difference strength to allow it to be used with particular advantage in cooking appliances.

Suitable glass-ceramics may be produced using different refining agents. Suitability is possessed, for example, by glass-ceramics which have been refined using $As_2O_3$, $Sb_2O_3$, $SnO_2$, $CeO_2$ or combinations thereof.

For example, glass-ceramics with the following composition in wt % based on oxide are suitable:

| Component | 1 | 2 | 3 | 4 | Range |
|---|---|---|---|---|---|
| $Al_2O_3$ | 21.23 | 21.35 | 21.30 | 20.47 | 20-23 |
| $As_2O_3$ | 0.59 | 0.00 | 0.01 | 0.00 | 0-1 |
| BaO | 1.65 | 1.57 | 1.70 | 1.71 | 1-2 |
| CaO | 0.23 | 0.32 | 0.39 | 0.32 | 0-1 |
| $CeO_2$ | 0.00 | 0.00 | 0.22 | 0.22 | 0-0.5 |
| $Cr_2O_3$ | 0 | 0 | 0 | 0 | 0-0.1 |
| CoO | 0 | 0 | 0 | 0 | 0-0.1 |
| $Fe_2O_3$ | 0.11 | 0.09 | 0.10 | 0.07 | 0.01-0.3 |
| $K_2O$ | 0.14 | 0.12 | 0.14 | 0.24 | 0-1 |
| $Li_2O$ | 3.65 | 3.90 | 3.94 | 3.62 | 3.0-4.5 |
| MgO | 0.43 | 0.67 | 0.58 | 0.58 | 0-1 |
| $MnO_2$ | 0.02 | 0.02 | 0.00 | 0.14 | 0-0.5 |
| $MoO_3$ | 0 | 0 | 0 | 0 | 0-0.4 |
| $Na_2O$ | 0.66 | 0.66 | 0.68 | 0.44 | 0-1 |
| $Nd_2O_3$ | 0 | 0 | 0 | 0 | 0-0.5 |
| NiO | 0 | 0 | 0 | 0 | 0-0.5 |
| $P_2O_5$ | 0.87 | 0.78 | 0.95 | 1.18 | 0-3 |
| $Sb_2O_3$ | 0.00 | 0.00 | 0.00 | 0.07 | 0-0.2 |
| $SiO_2$ | 64.43 | 64.33 | 63.80 | 64.35 | 60-68 |
| $SnO_2$ | 0.02 | 0.24 | 0.23 | 0.18 | 0-0.6 |
| $TiO_2$ | 2.95 | 3.03 | 3.11 | 3.09 | 2-4 |
| $V_2O_5$ | 0.21 | 0.03 | 0.03 | 0.03 | 0-0.4 |
| ZnO | 1.19 | 1.25 | 1.23 | 1.61 | 0.5-3 |
| $ZrO_2$ | 1.58 | 1.60 | 1.54 | 1.52 | 0.5-3 |

Such glass-ceramics may also contain up to 2 wt % of further constituents as well, especially in the form of impurities.

It may be advantageous for the glass-ceramic to be volume-coloured. This is advantageous because in this way the glass-ceramic itself—in particular without any mandatory requirement for a masking layer on the user-facing side or the side remote from the user—is sufficiently opaque to shade off those components of a cooking appliance that are disposed behind the plate.

According to a further embodiment, the plate comprises a glass-ceramic, and the plate comprises no vitreously embodied surface zone on the at least one side. It has emerged that in this way it is possible to achieve a particularly planar surface with only low roughness on the at least one side. This may be achieved in particular where the at least one side of the plate is ground and polished.

According to a further preferred embodiment of the plate, it features an improved character surround area haze. This value describes the number of defects or satellites of the drop of the liquid or other printing ink around the deposited drop or the printed image. In the case of the plate according to the present disclosure, this value is improved, owing in particular to the low roughness and/or high planarity of the plate. In a contactless process, the droplets can in this way be deposited evenly, and deflection of the drop is likewise much less likely.

The present disclosure also relates to a process for producing a plate comprising a glass or a glass-ceramic, more particularly a plate according to one embodiment of the present disclosure. The process comprises the steps of: providing a plate comprising a glass or a glass-ceramic. More particularly the plate may comprise a lithium aluminium silicate glass or a lithium aluminium silicate glass-ceramic. Preferably the plate has a thickness of between 2 mm and 6 mm. The plate in particular has a plate-like embodiment, i.e., having two mutually opposite, preferably parallel, side faces and a circumferential edge face, grinding at least one side of the plate, polishing at least one side of the plate, preferably the side which has been previously ground, printing at least one side of the plate, preferably the side which has been previously ground and/or polished, on at least two different subregions of the at least one region of the at least one side of the plate, so that a coating is disposed in these at least two different subregions, where the at least two subregions are at least 3 cm, preferably at least 9 cm and more preferably at least 15 cm apart from one another. Preferably, the printing may take place by means of a contactless printing process, preferably by means of inkjet printing, and baking of the coating.

The baking may take place by a multiplicity of known processes. For example, the baking may take place in a furnace, more particularly a furnace for the thermal prestressing of glasses or for the ceramicization of glass-ceramics. In this context, in particular, tunnel furnaces may also be employed. The temperatures for the baking may be more than 650° C., more than 700° C. or even more than 750° C.

Furthermore, however, it is also possible to use optical processes such as laser irradiation, more particularly using $CO_2$ lasers, flash lamps ("photonic flash sintering") or short-wave infrared radiation (SWIR emitters).

The process, according to embodiments, may also be performed, for example, such that what is called a green glass is printed, for example. This green glass is then transformed into a glass-ceramic in the course of the firing (referred to as primary firing).

It may, however, be preferable to print on a glass-ceramic itself. This glass-ceramic may have been ground and polished prior to ceramicization. However, it is likewise possible, and may also be preferable, to perform the steps of grinding and polishing only following transformation into the glass-ceramic. This may be advantageous for the reason that it specifically enables a high level of dimensional integrity on the part of the plate. Indeed, as a result of ceramicization, because of the required temperatures involved, there may well be changes in size in the glass-ceramic (contraction, for example), with the consequence that the high surface quality, with the advantageous planarity of the plate, could then be reduced. It is also possible that during a ceramicization the roughness of the surface increases because of oxidizing impurities and/or the conformation of the softening glass body to the underlay plate. This can be avoided if the good surface properties of the plate are established by grinding and polishing only after the ceramicization. In this case, the coating is then fired in what is called a secondary firing, in which case temperatures lower than for the primary firing are also possible.

According to one embodiment of the process, the coating comprises a glass flux and/or is embodied as an enamel. The coating preferably comprises a glass flux or is embodied as enamel and it further comprises at least one pigment, where with particular preference the at least one pigment comprises no pigment particles having a primary grain size, determined as the $d_{50}$ of the equivalent diameter, of more than 1.0 μm, especially preferably no pigment particles having a primary grain size, determined as the $d_{90}$ of the equivalent diameter, of more than 2.5 μm.

According to one embodiment, the plate comprises a glass, more particularly a green glass, and the baking of the coating takes place during a ceramicization step in which the glass is transformed into a glass-ceramic.

According to a further preferred embodiment, the plate comprises a glass-ceramic, and the baking of the coating takes place in a secondary firing.

The present disclosure also relates to a plate comprising glass or glass-ceramic, preferably according to embodiments of the present disclosure, produced or producible in a process according to one embodiment.

The present disclosure also relates to the use of a plate according to embodiments and/or produced in a process according to an embodiment as a cooking surface. A cooking surface in the context of the present disclosure refers to a plate which is used as a covering plate in a cooking appliance. A cooking surface of this kind may also be referred to synonymously as a cookplate. A cooking appliance in the context of the present disclosure refers to an appliance for the preparation of foods by means of heating, more particularly to what is called a hob on which cookware is placed.

The invention is elucidated further below with examples and with comparative examples.

EXAMPLE 1

A volume-coloured, ceramicized glass-ceramic material ($600*600\ mm^2$) was subjected to a two-stage ablation process.

The first step was a coarse grinding ablation with a rotating pad (d=15 cm) soaked with a $CeO_2$ suspension. The $d_{50}$ of the abrasive grains was between 2 and 2.5 μm. The process was continued until the flatness of the plate was less than 0.1% of the diagonal of the plate—in this case, therefore, less than 600 μm.

After the target flatness had been achieved, a $CO_2$ laser having a spatial wavelength range of 100 μm was used to reduce the initial roughness, through local heating, to an extent such that the roughness $R_{Z,mean}$ was less than 0.5 μm.

The surface thus polished was printed via inkjet with a flux amenable to secondary firing. The printing ink was baked in a firing process lasting 45 minutes with a maximum temperature of 750° C.

The print or the printed image thereafter exhibited very little variance in print quality over the plate (raggedness in the case of lines having a width of 300 μm was 22.26 μm).

The composition of the plate is given in the following table:

| Component | wt % |
|---|---|
| $Li_2O$ | 3.74 |
| $Al_2O_3$ | 21.29 |
| $SiO_2$ | 65.21 |
| $TiO_2$ | 3.64 |
| $ZrO_2$ | 0.90 |
| $SnO_2$ | 0.28 |
| $As_2O_3$ | |
| $Cr_2O_3$ | 0.0035 |
| $P_2O_5$ | 0.052 |
| $MnO_2$ | 0.021 |
| $Na_2O$ | 0.56 |
| $K_2O$ | 0.41 |
| MgO | 0.31 |
| CaO | 0.44 |
| BaO | 1.31 |
| ZnO | 1.58 |
| $V_2O_5$ | 0.0026 |
| $MoO_3$ | 0.046 |
| $Fe_2O_3$ | 0.089 |
| $\alpha_{50-700}$ | |
| $\alpha_{20-70}$ | $0.14 * 10^{-6}/K$ |
| $\alpha_{25-700}$ | |

The composition of the glass flux is given in the table below:

| Component | wt % |
|---|---|
| $SiO_2$ | 47.5 |
| $B_2O_3$ | 19 |
| $Al_2O_3$ | 2 |
| $Li_2O$ | 4 |
| $Na_2O$ | 7.5 |
| $K_2O$ | 4 |
| CaO | 1 |
| BaO | 2 |
| ZnO | 8.75 |
| $TiO_2$ | 3.8 |
| $Sb_2O_3$ | 0.2 |

The printing ink used for printing had a composition as follows:

| | |
|---|---|
| Glass flux 1 | 2.98 wt % |
| Black pigment $CuCr_2O_4$ | 1.05 wt % |
| White pigment $TiO_2$ | 0.87 wt % |
| Dipropylene glycol methyl ether | 62.71 wt % |
| Additive 1 | 2.09 wt % |
| Additive 2 | 0.30 wt % |

Additive 1 is poly(oxy-1,2-ethanediyl), a-methyl-w-phosphate. Additive 2 is polyether-modified polymethylsiloxane.

Using this printing ink, a resulting effective linear thermal expansion coefficient, $\alpha_{20-300,eff}$, based on the pigment particles and glass particles encompassed by the printing ink, of $9.15*10^{-6}/K$ is achieved.

EXAMPLE 2

A volume-coloured, ceramicized glass-ceramic material ($600*600\ mm^2$) was subjected to a two-stage ablation process.

The first step was a coarse grinding ablation with a rotating pad (d=15 cm) soaked with a $CeO_2$ suspension. The $d_{50}$ of the abrasive grains was between 2 and 2.5 μm. The process was continued until the flatness of the plate was less than 0.1% of the diagonal of the plate—in this case, therefore, less than 600 μm.

After the target flatness had been achieved, ion beam figuring (IBF) was used to ablate further material, until the roughness $R_{Z,mean}$ was less than 0.5 μm.

The surface thus polished was printed via inkjet with a flux amenable to secondary firing. The printing ink was baked in a firing process lasting 45 minutes with a maximum temperature of 750° C.

The print or the printed image thereafter exhibited very little variance in print quality over the plate (raggedness in the case of lines having a width of 300 μm was 29.04 μm).

The composition of the glass-ceramic material used is given in the following table:

| Component | wt % |
|---|---|
| $Li_2O$ | 3.74 |
| $Al_2O_3$ | 21.29 |
| $SiO_2$ | 65.21 |
| $TiO_2$ | 3.64 |
| $ZrO_2$ | 0.90 |
| $SnO_2$ | |
| $As_2O_3$ | |
| $Cr_2O_3$ | 0.0035 |
| $P_2O_5$ | 0.052 |
| $MnO_2$ | 0.021 |
| $Na_2O$ | 0.56 |
| $K_2O$ | 0.41 |
| MgO | 0.31 |
| CaO | 0.44 |
| BaO | 1.31 |
| ZnO | 1.58 |
| $V_2O_5$ | 0.0026 |
| $MoO_3$ | 0.046 |
| $Fe_2O_3$ | 0.089 |
| $\alpha_{50-700}$ | |
| $\alpha_{20-70}$ | 0.14 |
| $\alpha_{25-700}$ | |

The composition of the glass flux used is given in the table below:

| Component | wt % |
|---|---|
| $SiO_2$ | 47.5 |
| $B_2O_3$ | 19 |
| $Al_2O_3$ | 2 |
| $Li_2O$ | 4 |
| $Na_2O$ | 7.5 |
| $K_2O$ | 4 |
| CaO | 1 |
| BaO | 2 |
| ZnO | 8.75 |
| $TiO_2$ | 3.8 |
| $Sb_2O_3$ | 0.2 |

The printing ink used had a composition as follows:

| | |
|---|---|
| Glass flux 1 | 2.98 wt % |
| Black pigment $CuCr_2O_4$ | 1.05 wt % |

-continued

| | |
|---|---|
| White pigment $TiO_2$ | 0.87 wt % |
| Dipropylene glycol methyl ether | 62.71 wt % |
| Additive 1 | 2.09 wt % |
| Additive 2 | 0.30 wt % |

Additive 1 is poly(oxy-1,2-ethanediyl), a-methyl-w-phosphate. Additive 2 is polyether-modified polymethylsiloxane. This achieves a resulting effective linear thermal expansion coefficient, $\alpha_{20\text{-}300,eff}$, based on the pigment particles and glass particles encompassed by the printing ink, of $9.15*10^{-6}$/K.

EXAMPLE 3

A green glass material (600*600 $mm^2$) was subjected to a two-stage ablation process.

The first step was a coarse grinding ablation with a rotating pad (d=15 cm) soaked with a $CeO_2$ suspension. The $d_{50}$ of the abrasive grains was between 2 and 2.5 μm. The process was continued until the flatness of the plate was less than 0.1% of the diagonal of the plate—in this case, therefore, less than 600 μm.

After the target flatness had been achieved, a $CO_2$ laser having a spatial wavelength range of 100 μm was used to reduce the initial roughness, through local heating, to an extent such that the roughness $R_{Z,mean}$ was less than 0.5 μm.

The surface thus polished was printed via inkjet with a flux amenable to secondary firing. The printing ink was baked in a firing process lasting 45 minutes with a maximum temperature of 750° C.

The print or the printed image thereafter exhibited very little variance in print quality over the plate (raggedness in the case of lines having a width of 300 μm was 23.02 μm).

After printing, the substrate with the print was subjected to a ceramicization process and transformed into a glass-ceramic.

COMPARATIVE EXAMPLE 1

In comparative example 1, good flatness is accompanied by poor—that is high—roughness. This leads to a greatly altered raggedness of the printed image, as shown below.

A volume-coloured, ceramicized glass-ceramic material (600*600 $mm^2$) was subjected to an only one-stage ablation process.

This step was a coarse grinding ablation with a rotating pad (d=15 cm) soaked with a $CeO_2$ suspension. The $d_{50}$ of the abrasive grains was between 2 and 2.5 μm. The process was continued until the flatness of the plate was less than 0.1% of the diagonal of the plate—in this case, therefore, less than 600 μm.

After the target flatness had been reached, no further polishing was performed. The roughness $R_{Z,mean}$ was 0.7 μm.

The surface thus polished was printed via inkjet with a flux amenable to secondary firing. The printing ink was baked in a firing process lasting 45 minutes with a maximum temperature of 750° C.

The print or the printed image thereafter exhibited variance in print quality over the plate (raggedness in the case of lines having a width of 300 μm was 45.3 μm).

The composition of the plate is given in the following table:

| Component | wt % |
|---|---|
| $Li_2O$ | 3.74 |
| $Al_2O_3$ | 21.29 |
| $SiO_2$ | 65.21 |
| $TiO_2$ | 3.64 |
| $ZrO_2$ | 0.90 |
| $SnO_2$ | 0.28 |
| $As_2O_3$ | |
| $Cr_2O_3$ | 0.0035 |
| $P_2O_5$ | 0.052 |
| $MnO_2$ | 0.021 |
| $Na_2O$ | 0.56 |
| $K_2O$ | 0.41 |
| MgO | 0.31 |
| CaO | 0.44 |
| BaO | 1.31 |
| ZnO | 1.58 |
| $V_2O_5$ | 0.0026 |
| $MoO_3$ | 0.046 |
| $Fe_2O_3$ | 0.089 |
| $\alpha_{50\text{-}700}$ | |
| $\alpha_{20\text{-}70}$ | $0.14 * 10^{-6}$/K |
| $\alpha_{25\text{-}700}$ | |

The composition of the glass flux is given in the table below:

| Component | wt % |
|---|---|
| $SiO_2$ | 47.5 |
| $B_2O_3$ | 19 |
| $Al_2O_3$ | 2 |
| $Li_2O$ | 4 |
| $Na_2O$ | 7.5 |
| $K_2O$ | 4 |
| CaO | 1 |
| BaO | 2 |
| ZnO | 8.75 |
| $TiO_2$ | 3.8 |
| $Sb_2O_3$ | 0.2 |

The printing ink used for printing had a composition as follows:

| | |
|---|---|
| Glass flux 1 | 2.98 wt % |
| Black pigment $CuCr_2O_4$ | 1.05 wt % |
| White pigment $TiO_2$ | 0.87 wt % |
| Dipropylene glycol methyl ether | 62.71 wt % |
| Additive 1 | 2.09 wt % |
| Additive 2 | 0.30 wt % |

Additive 1 is poly(oxy-1,2-ethanediyl), a-methyl-w-phosphate. Additive 2 is polyether-modified polymethylsiloxane.

Using this printing ink, a resulting effective linear thermal expansion coefficient, $\alpha_{20\text{-}300,eff}$, based on the pigment particles and glass particles encompassed by the printing ink, of $9.15*10^{-6}$/K is achieved.

COMPARATIVE EXAMPLE 2

In comparative example 2, poor flatness is accompanied nevertheless by good—i.e., low—roughness of the plate. This leads, as shown below, to poor raggedness of the printed image.

The volume-coloured, ceramicized glass-ceramic material (600*600 $mm^2$) was subjected to a one-stage ablation process.

No grinding process for achieving the flatness was carried out. The flatness was 789 μm.

The plate was treated by means of a $CO_2$ laser with a spatial wavelength range of 100 μm to reduce the initial roughness, through local heating, to an extent such that the roughness $R_{Z,mean}$ was less than 0.5 μm.

The surface thus polished was printed via inkjet with a flux amenable to secondary firing. As a result of the low flatness, it was necessary to alter the printhead distance during printing, in order to prevent damage to the printhead. Consequently, the drops generated in the printhead had a different path length to the substrate. The printing ink was baked in a firing process lasting 45 minutes with a maximum temperature of 750° C.

The print or the printed image thereafter exhibited variance in print quality over the plate (raggedness in the case of lines having a width of 300 μm was 62.8 μm).

The composition of the plate is given in the following table:

| Component | wt % |
|---|---|
| $Li_2O$ | 3.74 |
| $Al_2O_3$ | 21.29 |
| $SiO_2$ | 65.21 |
| $TiO_2$ | 3.64 |
| $ZrO_2$ | 0.90 |
| $SnO_2$ | 0.28 |
| $As_2O_3$ | |
| $Cr_2O_3$ | 0.0035 |
| $P_2O_5$ | 0.052 |
| $MnO_2$ | 0.021 |
| $Na_2O$ | 0.56 |
| $K_2O$ | 0.41 |
| MgO | 0.31 |
| CaO | 0.44 |
| BaO | 1.31 |
| ZnO | 1.58 |
| $V_2O_5$ | 0.0026 |
| $MoO_3$ | 0.046 |
| $Fe_2O_3$ | 0.089 |
| $\alpha_{50\text{-}700}$ | |
| $\alpha_{20\text{-}70}$ | $0.14 * 10^{-6}$/K |
| $\alpha_{25\text{-}700}$ | |

The composition of the glass flux is given in the table below:

| Component | wt % |
|---|---|
| $SiO_2$ | 47.5 |
| $B_2O_3$ | 19 |
| $Al_2O_3$ | 2 |
| $Li_2O$ | 4 |
| $Na_2O$ | 7.5 |
| $K_2O$ | 4 |
| CaO | 1 |
| BaO | 2 |
| ZnO | 8.75 |
| $TiO_2$ | 3.8 |
| $Sb_2O_3$ | 0.2 |

The printing ink used for printing had a composition as follows:

| | |
|---|---|
| Glass flux 1 | 2.98 wt % |
| Black pigment $CuCr_2O_4$ | 1.05 wt % |
| White pigment $TiO_2$ | 0.87 wt % |
| Dipropylene glycol methyl ether | 62.71 wt % |

-continued

| | |
|---|---|
| Additive 1 | 2.09 wt % |
| Additive 2 | 0.30 wt % |

Additive 1 is poly(oxy-1,2-ethanediyl), a-methyl-w-phosphate. Additive 2 is polyether-modified polymethylsiloxane.

Using this printing ink, a resulting effective linear thermal expansion coefficient, $\alpha_{20\text{-}300,eff}$, based on the pigment particles and glass particles encompassed by the printing ink, of $9.1 * 10^{-6}$/K is achieved.

BRIEF DESCRIPTION OF THE DRAWINGS

The invention is elucidated further below with figures, in which.

DETAILED DESCRIPTION

Figure 1A:
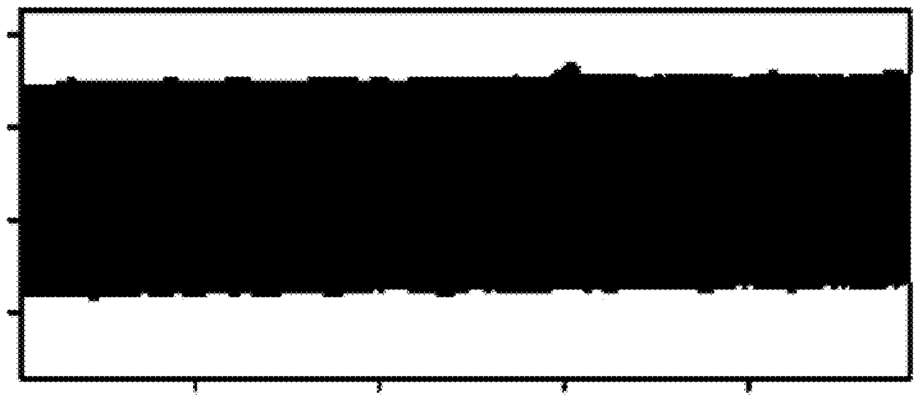
FIGS. 1*a*-1*c* show schematic representations for explaining raggedness.
Figure 1B:
Figure 1C:
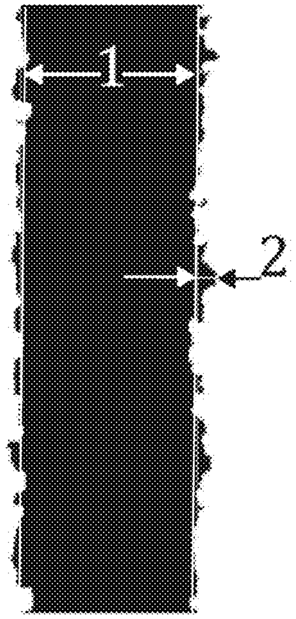

FIGS. 1*a*-1*c* are schematic representations explaining the principle of raggedness and its determination.

Represented in FIG. 1*a* and FIG. 1*b* are two printed images, of which that represented in FIG. 1*a* has only low raggedness and that in FIG. 1*b* high raggedness. "Raggedness", or brokenness, may be conceived as a measure of the quality of a printed image, more particularly of its edge definition. In this relationship, high raggedness denotes low edge definition, and vice versa.

FIG. 1*a* and FIG. 1*b* show enlargements of two "line prints". In FIG. 1*b*, the representation with high raggedness, the individual drops are in some cases still readily apparent, since they were able to run out only insufficiently to give a homogeneous printed image. The edge definition developed is low, with holes visible in the printed image in some cases.

This is contrasted by the representation in FIG. 1*a*, in which the edge definition is obviously better—corresponding in turn to low raggedness.

FIG. 1*c* shows, schematically, the enlarged printed image of a "line". Selected first is the region which is significant in terms of the line width 1, and a straight line is fitted to each of the edges of the line. These two straight lines, which show the borders of the "ideal line", are represented schematically in the representation in FIG. 1*c* as white lines on the black printed image.

On the basis of these two lines, the standard deviation of the real borders of the printed image on both sides from the ideal line is then determined, as is represented schematically at the site 2 in FIG. 1*c*.

The raggedness is the arithmetic mean of the standard deviations on one side, here the "left-hand" side, and the other side, here the "right-hand" side.

The plate according to one embodiment is preferably configured such that the raggednesses in the two subregions differ from one another only by at most 10%. The ratio of the raggedness in one subregion, R1, to the raggedness in the second subregion, R2, i.e., the value R1/R2, is preferably between 0.5 to 2, more preferably between 0.75 to 1.5, very preferably between 0.9 to 1.1.

Figure 2:
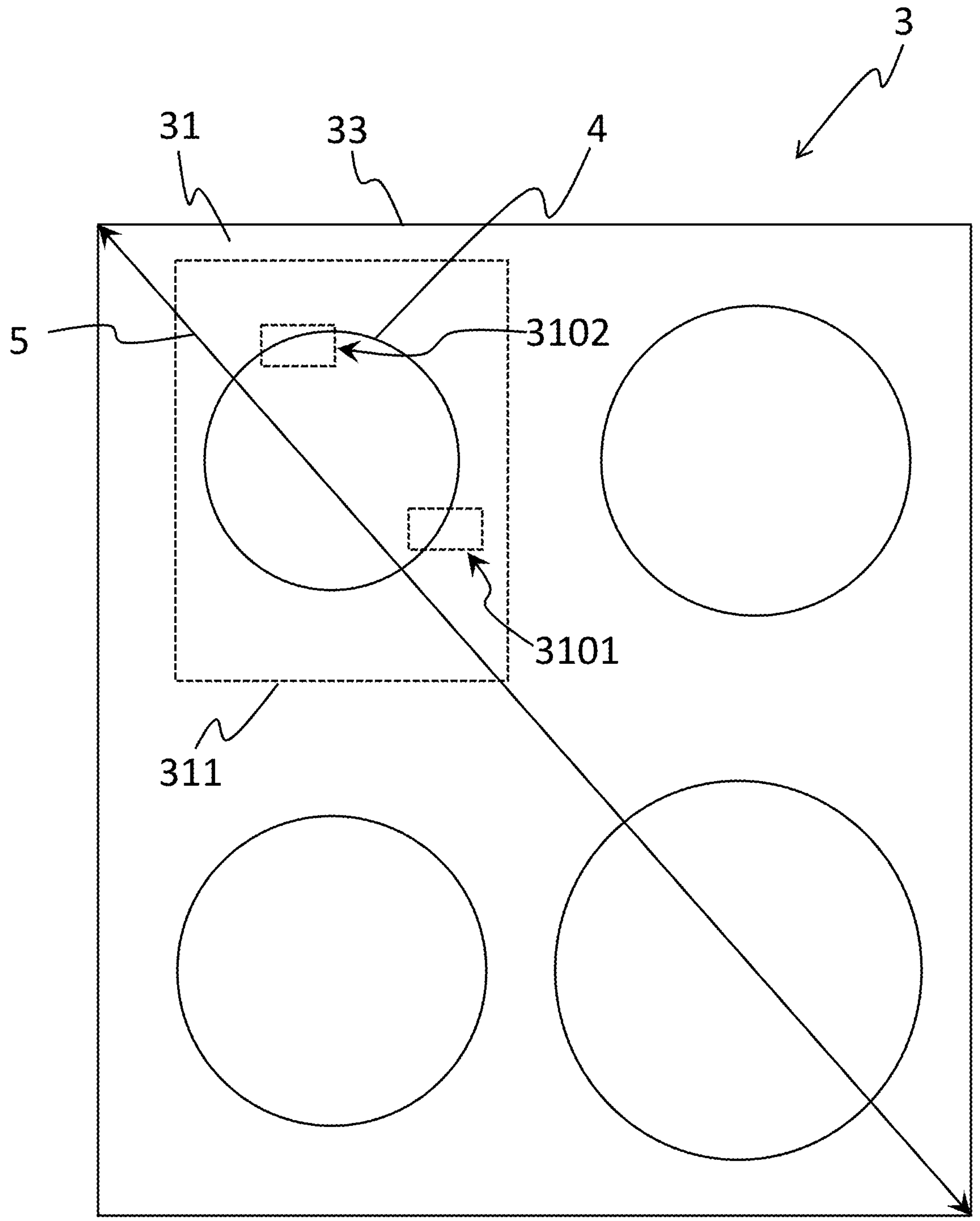
FIG. 2 shows a plan view of a schematic plate, not to scale, according to one embodiment.

FIG. 2 is a schematic representation, not to scale, of a plate 3 according to one embodiment. The plate 3 comprises a glass or a glass-ceramic. The glass may in particular be a lithium aluminium silicate glass, the glass-ceramic a lithium aluminium silicate glass-ceramic. The plate 3 preferably has a thickness of between 2 mm and 6 mm. The plate has two mutually opposing, preferably parallel, side faces, with presently only the side face 31 being visible, and also the circumferential edge face 33. The flatness of the plate 3 is less than or equal to 0.1% of a lateral dimension 5, which in this case, illustratively, is the diagonal of the rectangularly configured plate 3. The lateral dimension 5 under consideration may preferably be the maximum lateral dimension of the plate 3—for example, the diameter of a circular plate 3.

On at least one side of the plate 3, in this case the side 31, the plate has a mean surface roughness $R_{z,mean}$ in at least one region, presently the region 311, of less than 0.5 μm, with a standard deviation of the surface roughness, $\sigma_{Rz}$ of less than 0.1 μm. $R_{z,mean}$ and the standard deviation of the surface roughness, $\sigma_{Rz}$, are preferably determined by measuring the roughness $R_z$ at nine points on the plate 3, which are each at least 5 cm, preferably at least 10 cm and more preferably at least 15 cm apart from one another, and, from these nine measurement values, determining the arithmetic mean and the standard deviation; with particular preference, $R_z$ is determined by measurement of a line profile using a stylus device and with evaluation according to ISO 4287.

The roughness Rz is also referred to as roughness depth, and indicates the maximum height difference along a centre line over a specified measurement distance.

The plate 3 further comprises a coating 5, which is disposed on at least two different subregions 3101, 3102 of the region 311 of the at least one side 31 of the plate 3. Here, illustratively, the coating 41 is embodied as a cooking zone marking, specifically in the form of four rings applied to the side 31. The region 311 here comprises—illustratively—one of these cooking zone markings.

In principle it is possible for the region 311 to encompass the entire area of the side 31. In particular it is also possible, furthermore, for the subregions 3101 and 3102 of the region 311 to relate to different cooking zone markings.

The raggednesses of the coating 5 in the two subregions 3101 and 3102 differ from one another by not more than 10%, the raggedness being determined preferably according to ISO 24790.

According to one embodiment, the coating 5 may preferably be an inkjet printed coating.

Figure 3:
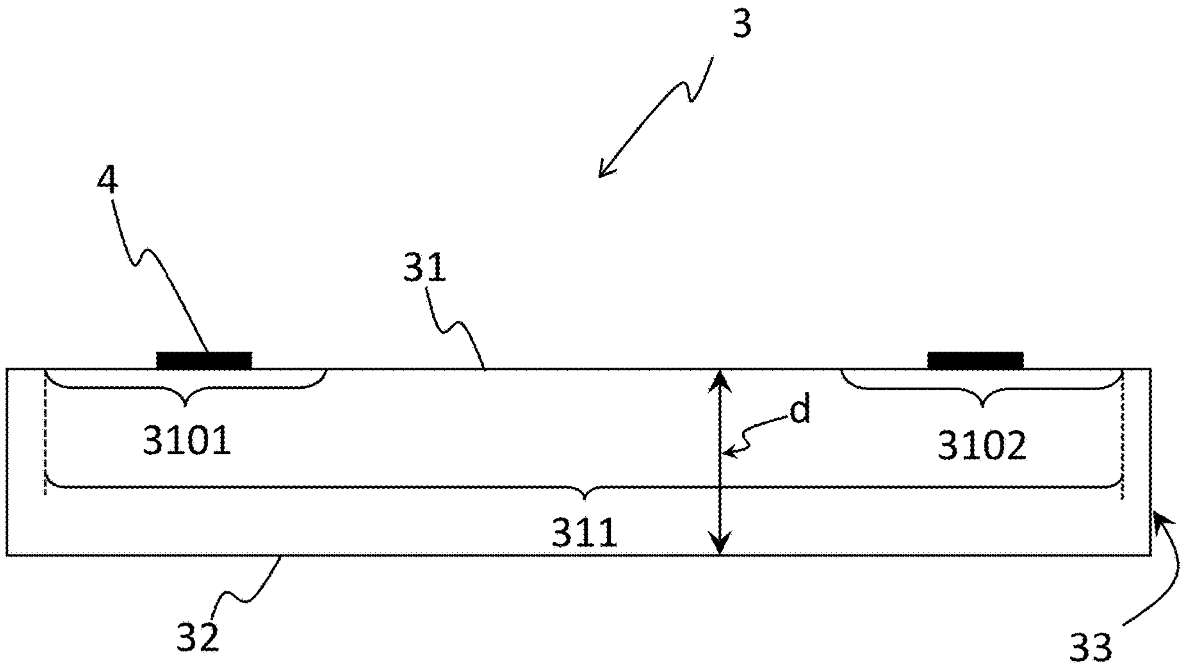
FIGS. 3 and 4 show respective side views of schematic plates, not to scale, according to embodiments.

FIG. 3 shows a schematic side view of, not to scale, and a section through, a plate 3 according to one embodiment. The plate 3, comprising a glass or a glass-ceramic, more particularly a lithium aluminium silicate glass or a lithium aluminium silicate glass-ceramic, has a thickness d which is preferably between 2 mm and 6 mm. The thickness of the plate 3 is understood generally to be the distance between the two side faces 31 and 32 of the plate 3. The two side faces 31 and 32 of the plate 3 are opposite one another and are preferably disposed parallel to one another within the bounds of measurement accuracy, as in the representation in FIG. 3.

An arrangement is understood to be parallel when the normal angles to the side faces 31 and 32 form an angle with one another of not more than 5°, preferably of not more than 2° and very preferably—within the bounds of customary manufacturing and measurement tolerances—of 0°.

If one side 31, 32 of the plate 3 has a nubbed embodiment, the normal angle is determined on the basis of the surface produced by the nub tips. This is shown schematically later on below with FIG. 4.

Further represented in FIG. 3 is the circumferential edge face 33 of the plate 3.

At least the side 31 on which, in particular, the coating 5 is also disposed has in at least one region 311, as set out, only a low mean roughness $R_{z,mean}$ of less than 0.5 μm with a standard deviation of the surface roughness, $\sigma_{Rz}$, of less than 0.1 μm.

Furthermore, the plate 3 comprises a coating 5 which is disposed on at least two different subregions 3101, 3102 of at the at least one region 311. The at least two subregions 3101, 3102 are at least 3 cm, preferably at least 9 cm and more preferably at least 15 cm apart from one another, with the raggednesses of the coating 5 in the two subregions 3101, 3102 differing from one another by not more than 10%, the raggedness being determined preferably according to ISO 24790.

Provision may be made for the side 32 as well to be embodied as a very smooth and/or very planar face. However, it is likewise possible, and may indeed be preferable, for only one side to have the particularly good roughness and flatness, in this case the side 31, which faces the user or operative in the operation of an appliance, such as a hob, for example. Provision may be made in particular for the region 311 of the side 31 of the plate 3 to encompass the entire area of the side 31—that is in other words, for the entire side 31 to be embodied as a very smooth, flat face. In this way, indeed, it is possible to achieve uniformly good printed images on the entire side 31, including in particular in a contactless printing process such as inkjet printing, for example.

In the case where the side 32 of the plate 3, which is opposite the side 31 configured as the top side, is not likewise so smooth and flat in its embodiment as the side 31, provision may be made for the side 32 to have, for example, a nubbed embodiment. This may be combined advantageously, for example, with the plate 3 comprising a glass-ceramic which is coloured, since in this case the nubs are not disruptively visible through the intrinsic colouration of the glass-ceramic comprised by the plate 3. Such a configuration may be advantageous in particular in the case where particularly good strength of the plate 3 is desired.

Figure 4:
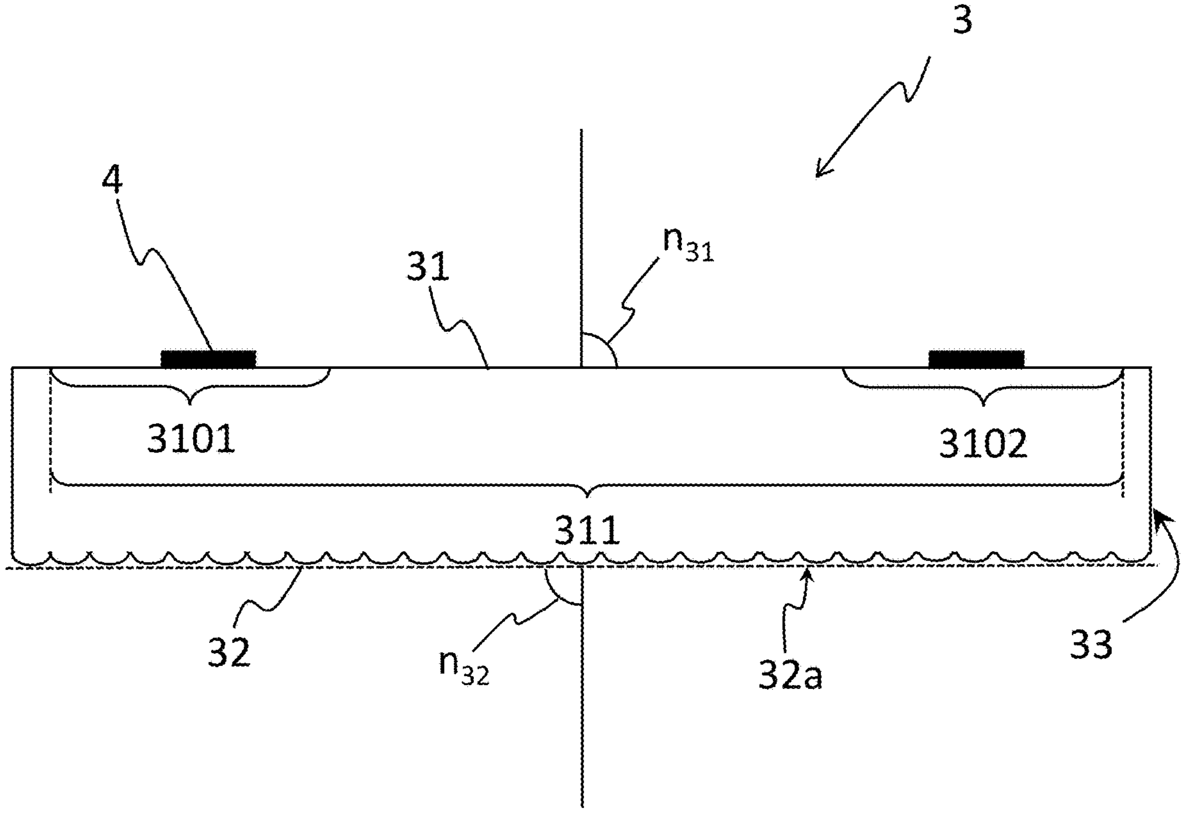

FIG. 4, in a schematic representation not to scale, shows a side view of a plate 3 according to one embodiment. The plate 3 has a side 31 which exhibits very good flatness and has a very low mean roughness depth, thus being very smooth in its embodiment. The side 31 is embodied as the top side, thus being intended to face the user in the operational use of an appliance for which the plate 3 is used as covering plate (for example, for a hob). On the side 31 of the plate 3, the coating 4, which may have been applied in particular by a contactless printing process, such as inkjet printing, for example, is disposed in the two subregions 3101, 3102 of the region 311, which has at least the good flatness and smoothness. Generally, for example, without restriction to the plate 3 example represented specifically here, the coating 4 may be embodied as a cooking zone marking, or else as a logo. In particular, the coating 4 may be embodied as a glass flux-based coating or may comprise a glass flux or may be embodied as an enamel, and it is additionally possible, and may even be preferable, for the coating 4 to be embodied as a glass flux-based coating (or to comprise a glass flux) or to be embodied as an enamel and additionally to comprise at least one pigment, more particularly a ceramic pigment. The at least one pigment preferably comprises no pigment particles having a primary grain size, determined as $d_{50}$ of the equivalent diameter, of more than 1.0 μm, very preferably no pigment particles having a primary grain size, determined as $d_{90}$ of the equivalent diameter, of more than 2.5 μm.

The plate 3 here, in the schematic depiction of FIG. 4, not to scale, is embodied such that the side 32 of the plate 3, which is opposite the side 31, has a nubbed embodiment. The two opposite sides 31, 32 are embodied here in such a way that they are parallel to one another. In order to determine this, as represented schematically in FIG. 4, the normal angle to the two sides 31, 32 is determined, i.e., the angles $n_{31}$ and $n_{32}$. For the case of a nubbed side 32, a surface 32*a*, represented in the schematic sectional representation of FIG. 4 as a dashed line, is ascertained for this purpose, this surface being produced by the tips of the nubs. The normal angle to this surface is then taken as the normal angle $n_{32}$ of the side 32.

As is apparent from the schematic representation in FIG. 4, the normals to the two sides 31, 32 are parallel to one another within the bounds of measurement accuracy, and so the sides 31, 32 are embodied parallel to one another within the bounds of measurement accuracy as well.

LIST OF REFERENCE SIGNS

1 line width
2 variance from edge of printed image
3 plate
31, 32 side faces of plate
32*a* ascertained area of a nubbed plate or side 32
33 circumferential edge face
311 region of side 31
3101, 3102 subregion of 311
4 coating
5 lateral dimension of 3
$n_{31}$, $n_{32}$ normal angles to 31, 32

What is claimed is:

1. A glass or glass-ceramic plate, comprising:
two mutually opposite side faces;
a thickness between the side faces of between 2 mm and 6 mm;
a circumferential edge face;
a flatness less than or equal to 0.1% of a lateral dimension between the side faces,
a region of a first face of the side faces having a mean surface roughness of less than 0.5 μm and a standard deviation of the surface roughness of less than 0.1 μm, wherein the mean surface roughness and the standard deviation of the surface roughness are determined by measuring a roughness at nine points on the first face by measuring a line profile with a stylus device and with evaluation according to ISO 4287, and wherein the nine points are at least 5 cm apart from one another; and
a coating on two subregions of the region, wherein the two subregions are at least 3 cm apart from one another, and wherein the coating is an inkjet print coating and has a raggedness in the two subregions that differ by not more than 10%.

2. The plate of claim 1, wherein the side faces are parallel to one another.

3. The plate of claim 1, wherein the glass or glass-ceramic plate is a lithium aluminium silicate glass or a lithium aluminium silicate glass-ceramic.

4. The plate of claim 1, wherein the nine points are at least 15 cm apart from one another.

5. The plate of claim 1, wherein the two subregions are at least 15 cm apart from one another.

6. The plate of claim 1, wherein the coating comprises a glass flux and/or is an enamel.

7. The plate of claim 6, wherein the coating further comprises a pigment.

8. The plate of claim 7, wherein the pigment comprises no pigment particles having a primary grain size, determined as $d_{50}$ of equivalent diameter, of more than 1.0 μm and/or comprises no pigment particles having a primary grain size, determined as $d_{90}$ of equivalent diameter, of more than 2.5 μm.

9. The plate of claim 1, wherein the side faces each lack a nubbed structure or wherein the first face lacks a first nubbed structure and a second face of the side faces has a second nubbed structure.

10. The plate of claim 1, wherein the glass or glass-ceramic plate comprises a volume-coloured glass-ceramic and/or comprises no vitreously embodied surface zone on the first face.

11. The plate of claim 1, wherein the glass or glass-ceramic plate is configured for use as a cooking surface.

* * * * *